Nov. 6, 1923.　　　　　　　　　　　　　　　　1,473,018
F. E. DANNER
SOLAR HEATER
Filed Sept. 3, 1921
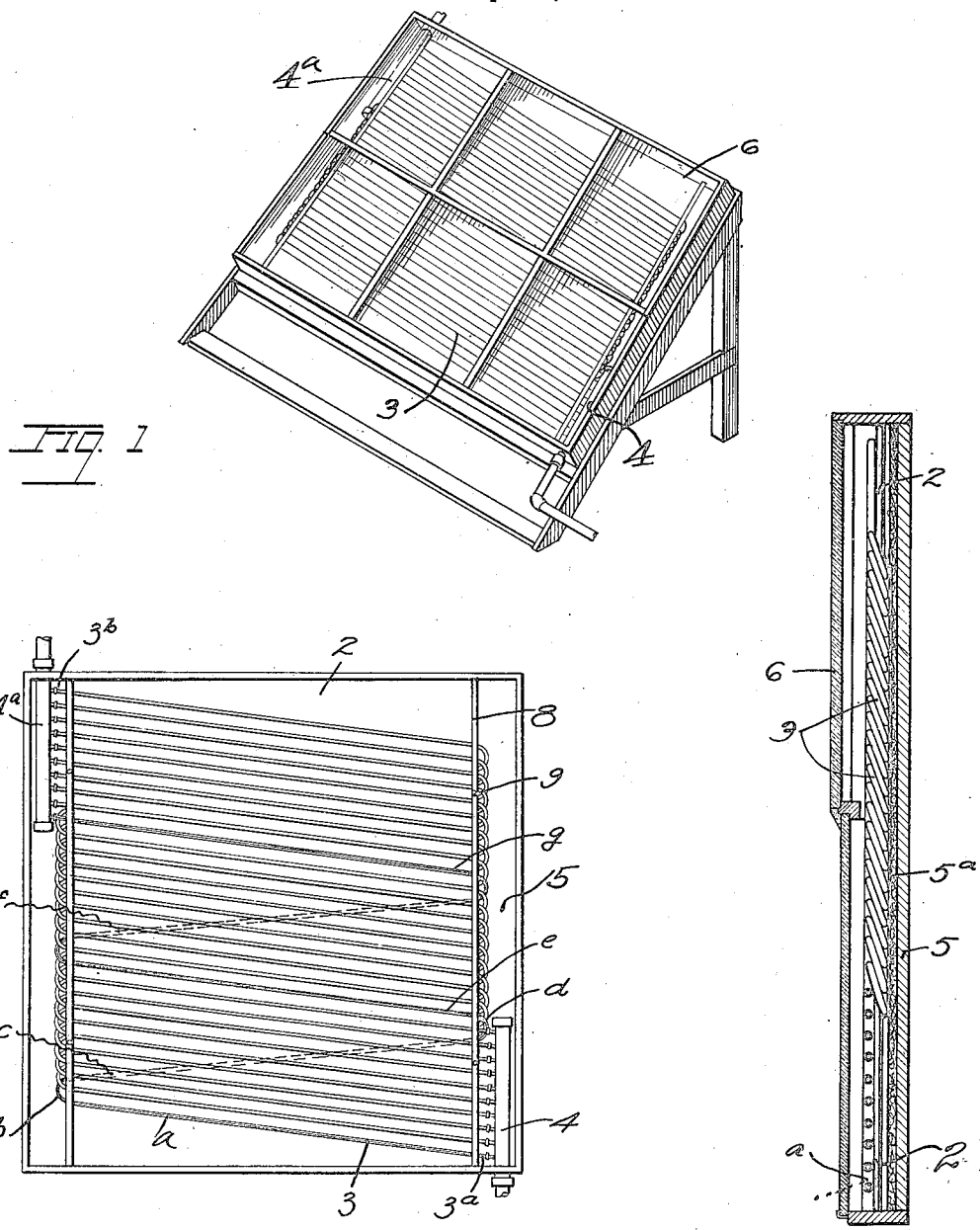
INVENTOR
F.E. DANNER
BY
White Frost & Evans
his ATTORNEYS
WITNESS Patented Nov. 6, 1923.

1,473,018

UNITED STATES PATENT OFFICE.

FREDERICK E. DANNER, OF WILLOWS, CALIFORNIA.

SOLAR HEATER.

Application filed September 3, 1921. Serial No. 498,243.

*To all whom it may concern:*

Be it known that I, FREDERICK E. DANNER, a citizen of the United States, and a resident of Willows, county of Glenn, State of California, have invented a new and useful Solar Heater, of which the following is a specification.

This invention relates to heating apparatus designed to utilize heat from sun rays.

It is an object of the present invention to provide a solar heater of extreme simplicity and low cost of construction.

It is another object of the invention to provide a solar heater of substantially immovable parts and of rigidity of construction and which can be readily installed in a convenient location to derive heat from the sun's rays, as for the heating of water.

It is another object of the invention to provide a solar heater in which there is a substantially unitary device forming the principal heat receiving element and which is constructed of simple parts arranged and connected for the efficient absorption of heat from the sun's rays. In this connection, another object is to provide a conductor of simple construction and inexpensive material, the conductor consisting of a tubular coil of such nature that a suitable number of the coils can be compactly arranged upon a heat absorbing barrier and closely connected thereto for the efficient transfer of heat from the barrier to the conducting tubes.

The invention possesses other objects and features of advantage, some of which, with the foregoing, will be made manifest in the following description of the preferred form of the invention, which is illustrated in the drawings accompanying and forming part of the specification. It is to be understood that it is not intended to limit the invention to the embodiment shown by the said drawings and description, as variations may be adopted within the scope of the invention as set forth in the claims.

Figure 1 is a perspective view of the complete heater.

Fig. 2 is a plan of the heating unit arranged upon its mounting; the transparent cover plate being removed.

Fig. 3 is a cross sectional view from top to bottom of the complete heater.

The solar heater of the present invention consists essentially of a preferably plane sheet metal or other heat absorbing plate to form a direct barrier when exposed to the sun's rays so that it will absorb a considerable degree of the solar heat and for the exchange of the heat from the sun, from the plate to a fluid, such for instance as water. There is associated with the plate or barrier a plurality of passageways of comparatively small transverse area with respect to the length of the passageway so that the fluid therein will be readily heated by conductivity of the heat from the intercepting barrier. Such passageways may be conveniently and inexpensively provided by the utilization of a small tubular conductor of any desired length, the conductor being arranged in any suitable number of transversely extending coils. Preferably, each conductor consists of a number of coils and a plurality of the conductors are arranged so that the longitudinal stretches of each coil are parallel to a similar stretch of a contiguous coil, the stretches all preferably being arranged in comparatively close relation so as to occupy closely the area of the upper and lower sides of the primary intercepting barrier. The ends of the coils at one end of the barrier are fitted with inlet connections and at the other end of the barrier with discharge connections, which connections may be readily connected to manifolds for supplying and conveying away the fluid heated in the heater.

In its preferred embodiment the heater includes a primary barrier member preferably of heavy sheet metal, as indicated at 2, which may be of any suitable dimensions according to the capacity desired. The conducting means of the heater preferably consists of a large number of conduits closely associated with the barrier 2, so that the heat absorbed thereby can be readily transmitted to the conduits and to the fluid therein. An inexpensive form of construction to secure conduction of the fluid consists of comparatively small tubing intimately secured to the barrier 2 so that, not only the direct heat rays impinging upon the exposed tubing are absorbed, but also the heat absorbed by the barrier 2 is quickly transferred to the conduit means and to the fluid therein; the conduit means being preferably closely arranged in any practicable manner.

A preferred form of conduit consists of a suitable number of pieces of small tubing, each piece being here shown as bent into a number of bends or coils, the tubing piece 3, in the present instance, having five longitudinal stretches, as clearly indicated in Fig.

2. The lowermost coil 3 has one stretch $a$, secured upon the top face of the barrier 2 and one end of the stretch $a$, is bent at $b$, around the plate 2, thence inclining in another stretch $c$, underneath the back of the barrier and by another bend $d$, around the opposite edge of the barrier into a further stretch $e$, across the top face of the barrier and returning again underneath, as at $f$, and finally across the top of the barrier, as at $g$. Each straight stretch of the coil 3 is secured to the top and bottom faces respectively, of the barrier plate 2, as by soldering, for instance, so as to provide effective exchange of heat from the body of the plate 2 to the material of the tubing 3, and thence to the fluid therein.

While one heating pipe or tubing piece 3 may be utilized and may have any suitable number of stretches extending to and fro across the plate from top to bottom, I prefer that a considerable number of the heating coils 3 be compactly arranged upon the plate 2, so that each of the coils 3 has portions passing above and below the plate and in close contact therewith. This arrangement provides for the ready supply and flow of fluid, such as water, to the lower intake ends $3^a$ of the set of coils and for the ready discharge of the heated water from the upper ends $3^b$ of the coils. From this it will be seen that the heating unit proper, consists of the heat intercepting barrier 2, with the conducting means having passageways which are closely arranged upon both faces of the plate 2.

To eliminate loss by radiation, the back of the unit 2—3 is preferably heavily coated with a non-conducting material, such as asbestos paint or other desirable substance and the top or face of the heating unit is preferably provided with a black coating because of its property of absorbing heat rays.

The heating unit proper is adapted to be arranged in any suitable manner, but preferably is enclosed in a substantially air-tight casing or box having a back or bottom 5, preferably of wood, having its inner face provided with a layer of insulating material, as a sheet of asbestos $5^a$, disposed above which is the insulated back of the unit. The bottom or back 5 is preferably of somewhat larger area than the heating unit, whose lower end has the terminals $3^a$ of the coils connected to an inlet manifold 4, while the discharge ends of the heating coils are connected to a discharge manifold $4^a$, which preferably lies within the side edges of the box bottom 5. The casing is preferably closed by a sash 6 to enclose the heating unit in a substantially air-tight chamber. The box is constructed to be substantially weather proof to prevent rain water from beating in, in such cases where the solar heater is arranged in an exposed position.

In the event that the barrier plate 2 is flexible, the unit structure may be substantially re-enforced by providing a suitable number of fastening strips or cleats 8 having their lower edges notched to receive the tubing of the coils 3; the re-enforcing and fastening strips 8 being bolted or otherwise secured, as at 9, from top to bottom of the barrier plate 2, and preferably at locations just within bends of the several coils which are therefore secured in place additionally to the soldering connection.

I have found by actual use of the heater, that water may be raised to from 120° to 140° Fahrenheit, this being the case when a comparatively small size heater was employed.

In a heater having exterior dimensions of about forty-seven inches by fifty-two inches, the depth would be about four and one-half inches and the heating coil or tube would be about three-eighths of an inch, outside diameter; it is understood that these dimensions are given only for an example, since the apparatus may be constructed of any desirable dimensions.

What is claimed is:

1. In a solar heater, a heating unit comprising a barrier and a plurality of conduits in intimate contact with the front and rear surfaces of said barrier whereby to absorb heat by direct ray contact and by exchange from said barrier.

2. In a solar heater, a heating unit comprising a flat barrier, a plurality of conduits wound around said barrier in intimate contact with the front and rear surfaces thereof whereby to absorb heat directly from the sun's rays and by exchange from the barrier, and common inlet and discharge connections for said conduits.

3. A solar heater comprising a casing having a front panel of transparent material, a flat plate barrier in the casing with its surface disposed substantially parallel to said transparent panel, and a conduit wound around said barrier in intimate contact with both surfaces thereof to absorb heat by direct ray contact and by exchange from the barrier.

4. A solar heater comprising a casing having a front panel of translucent material, a flat plate barrier in the casing disposed with one surface substantially parallel to the said front panel, a plurality of conduits tortuously wound around said barrier in intimate contact with the surfaces thereof, common inlet and discharge connections for said conduits, the front surface of said barrier and the adjacent portions of the conduits being blackened to absorb heat, and a layer of heat insulating material at the rear of said barrier plate and the adjacent portions of the conduits.

5. A solar heater having a main barrier and conduits, of comparatively small diameter, extending along the barrier in close relation to absorb heat by direct ray contact and by exchange from the barrier; the conduits each consisting of a zig-zag coil with inlet and discharge terminals, each coil having portions in intimate contact with the front and rear surfaces of the plate.

6. A solar heater having a main barrier and conduits, of comparatively small diameter, extending along the barrier in close relation to absorb heat by direct ray contact and by exchange from the barrier; the conduits each consisting of a zig-zag coil with inlet and discharge terminals, each coil having portions in intimate contact with the front and rear surfaces of the plate, and all the coils beginning at one corner and ending at the diagonally opposite corner of the unit.

In testimony whereof, I have hereunto set my hand.

FREDERICK E. DANNER